(12) United States Patent
Ozawa et al.

(10) Patent No.: US 6,549,390 B1
(45) Date of Patent: Apr. 15, 2003

(54) ACTUATOR CONTROLLER

(75) Inventors: Hidetaka Ozawa, Saitama (JP); Minoru Nakamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 182 days.

(21) Appl. No.: 09/670,347

(22) Filed: Sep. 27, 2000

(30) Foreign Application Priority Data

Sep. 28, 1999 (JP) .......................................... 11-274759

(51) Int. Cl.7 .............................................. H01H 47/00
(52) U.S. Cl. ...................................................... 361/139
(58) Field of Search ................................. 361/139, 143, 361/144, 152, 153, 159; 74/473.12, 473.18; 123/499

(56) References Cited

U.S. PATENT DOCUMENTS

| | | | | |
|---|---|---|---|---|
| 4,659,969 A | * | 4/1987 | Stupak | 318/128 |
| 5,199,392 A | * | 4/1993 | Kreuter | 123/90.1 |
| 5,416,665 A | * | 5/1995 | Nishiwaki et al. | 361/154 |
| 6,003,481 A | * | 12/1999 | Pishinger et al. | 123/90.1 |
| 6,176,207 B1 | * | 1/2001 | Wright et al. | 123/90.11 |
| 6,249,418 B1 | * | 6/2001 | Bergstrom | 361/152 |
| 6,366,441 B1 | * | 4/2002 | Ozawa et al. | 361/170 |
| 6,397,798 B1 | * | 6/2002 | Fiaccabrino | 123/90.11 |

FOREIGN PATENT DOCUMENTS

| | | | | |
|---|---|---|---|---|
| FR | WO 00/22283 | * | 4/2002 | F01L/9/04 |
| JP | 11-110963 | | 4/1999 | |

* cited by examiner

Primary Examiner—Brian Sircus
Assistant Examiner—Z Kitov
(74) Attorney, Agent, or Firm—Arent Fox Kintner Plotkin & Kahn, PLLC

(57) ABSTRACT

An electromagnetic actuator for driving a valve of an engine comprises a pair of springs which act in opposite directions, an armature which is connected to the springs and is supported in a neutral position provided by the pair of springs in an inactivated state, the armature being coupled to the valve, a pair of electromagnets which drive the armature between a valve open position and a valve closed position, estimating means for estimating magnetic flux to be generated by the electromagnet attracting the armature when the armature is driven from one of the positions to the other of the positions, and means for switching the electromagnet from the attractive operation to the holding operation in response to the magnetic flux reaching the target overshoot value.

19 Claims, 11 Drawing Sheets

ACTUATOR CONTROLLER

FIELD OF INVENTION

The present invention relates to an actuator controller for electromagnetic valves, and more specifically concerns a controller for an actuator which drives a valve of an engine which is used, for example, in an automobile and a boat or the like.

BACKGROUND OF THE INVENTION

Among valve operating systems which are driven by an electromagnetic actuator and called electromagnetic valve, the mechanism that drives a valve connected to an armature has used the following method for driving electromagnets (hereinafter, referred to as a "solenoid actuator" or simply "actuator"). Here, electric power is alternately supplied to a pair of opposing electromagnets to drive a movable iron piece, that is, an armature interposed between a pair of springs, to which an offset load has been applied.

1) A magnetic attractive force applied by one of the actuators to the armature overcomes a repulsion force of a pair of springs, thereby attracting the armature to a seating position. This armature (valve) is released from the seated state with stoppage of the power supply to the actuator as a turning point, and starts displacement in a cosine manner by the function of a pair of springs.

2) A catch current supplied to the other of the actuators at a timing corresponding to the displacement of the armature produces magnetic flux generating an attractive force.

3) As the armature approaches the other of the actuators that is generating the magnetic flux, the magnetic flux abruptly grows so that work by the attractive force of the other of the actuators overcomes the sum of a small work drawing the armature back by residual magnetic flux of the one of the actuators and a mechanical loss, which is a greater part of the work. Thus, the armature is attracted to seat on the other of the actuators.

4) As seating of the armature takes place, a holding current for holding the armature is supplied to the other of the actuators at an appropriate timing to maintain the armature in the seated position.

During a period of time for holding the armature, the holding current is normally supplied with a PWM (Pulse Width Modulation) scheme. Its specific method is described in U.S. patent application Ser. No. 09/534,054 filed on Mar. 24, 2000, which is incorporated herein by reference.

In the valve operating system of an ordinary automotive engine, the amplitude of the displacement of an armature interposed between a pair of opposing electromagnets can reach 6 to 8 mm. Actual valves experience secular changes in an electric, magnetic and/or mechanical systems, and also experiences unevenness in the operation. The following three points are the main causes.

1) The mechanical loss of the valve varies as the engine load fluctuates so that the magnitude of the mechanical work required for seating the armature varies, thus affecting the operation of the armature.

2) Since it is difficult to control a magnetic attracting force for holding the armature in the seated position, there is variation in the residual magnetic flux when the armature is released. As a result, the dead time from the time when the power supply to the actuator is stopped to the time when the armature actually departs from the actuator varies, affecting the subsequent control of the valve timing.

3) Change of the magnetic characteristic of magnetic material causes greater or smaller attractive force even at the same driving current, thereby making the armature holding operation unstable.

As a specific example, behavior of an electromagnetic actuator working at a high speed as used in the valve driving system of an engine will be described with reference to FIG. 3. The left vertical axis indicates the amount of lift (mm) of the armature as well as current (in ampere) to be supplied to the actuator, the right vertical axis indicating attractive force (N) and voltage (V) to be applied to the actuator. The arrows in the drawings indicate which scale is to be referred to, the right vertical axis or the left vertical axis.

At time 0, the armature is released from one of the actuators and starts displacement toward the other of the actuators by the work of a pair of springs. At time 3 ms, constant voltage (60V) starts to be applied to the other of the actuators causing magnetic flux to grow. During a period of 2.2 ms from the time 3ms to 5.2 ms, a constant voltage "c" is applied, and thereafter, a switching voltage waveform is applied by the PWM (Pulse Width Modulation) controller such that the current value becomes constant (0.45 A) as seen in curve "b". In FIG. 3, the voltage is indicated by a moving average value of switching voltage waveform.

In this example, the armature seats on the yoke surface 200 μs before the application of constant voltage is terminated. When the gap between the armature and the seating surface becomes small, magnetic flux which crosses the armature abruptly increases thereby generating a very large attractive force. In FIG. 3, a bold straight line "f" of the level of 300(N) indicates the minimum attractive force (necessary holding force) needed for holding the armature in the seated position, which depends on the hardness of a pair of springs holding the armature.

As is apparent from FIG. 3, an abrupt increase in the attractive force "h" before and after seating generates an overshoot over the necessary holding force. After the seating, the electric power supplied to the actuator is switched to provide a constant-current, and control is performed so as to generate slightly larger attractive force than the necessary holding force. But this control has the following problems.

In case of an automotive engine, the number of revolutions ranges from 600 to 7,000 rpm, and the armature holding time also greatly changes in proportion thereto. On a high-revolution side, the armature must be released quickly, thus making it impossible to secure the time required to generate slightly larger attractive force than the necessary holding force. As a result, the amount of overshoot varies due to an abrupt change in the attractive force before and after seating, correspondingly generating variations in the magnitude of the attractive force when the armature is released.

When the amount of overshoot is large and the attractive force at a point in time when the armature should be released is larger than the necessary holding force, the magnetic energy that the actuator has at this point in time is maintained in the form of eddy current, which is not released instantaneously. Therefore, between the time when release control of the armature starts and the time when the armature is actually released from the yoke is a time lag, that is, dead time of the armature release. In the example of the drawing, the dead time is 0.45 ms, but this time varies depending upon the amount of overshoot. These variations in the dead time cause differences in the valve timing, greatly affecting the output performance of the engine.

SUMMARY OF THE INVENTION

Therefore, it is an object of the present invention to provide control technique for quickly correcting overshooting of attractive force generated when the armature is seating, so as to provide an appropriate attractive force. It is also an object of the present invention to provide a control technique for providing an appropriate attractive force to the armature by compensating for variations in the lift timing of the armature.

An actuator according to a first aspect of the invention comprises: a pair of springs which act in opposite directions; an armature which is connected to the springs and is supported in a neutral position provided by the pair of springs in an inactivated state, the armature being coupled to a mechanical element; a pair of electromagnets which drive the armature between a first terminal position and a second terminal position; estimating means for estimating magnetic flux to be generated by the electromagnet attracting the armature when the armature is driven from one of the terminal positions to the other of the terminal positions; and means for switching the electromagnet from the attractive operation to the holding operation in response to the magnetic flux reaching the target overshoot value.

The electromagnet is switched to the holding operation when the gross magnetic flux of the electromagnet attracting the armature reaches the target overshoot value, and therefore, the phenomenon in which the electromagnet maintains residual magnetic energy greater than necessary lessens. This leads to reduction in the variations in dead time in releasing the armature.

According to another aspect of the invention, there is provided an actuator, further comprising means for applying reverse voltage to the electromagnet generating an attractive force, thereby decreasing the magnetic flux from the maximum value to a value required for holding the armature, the reverse voltage being determined based on the maximum value of the magnetic flux estimated by the estimating means.

In order to decrease the magnetic flux of the electromagnet generating an attractive force from the maximum value to a value required for holding the armature, a reverse voltage is applied to the electromagnet. The attractive force of the electromagnet is speedily lowered to the holding force. Therefore, the armature can be released from the electromagnet at a fast timing enabling the actuator to be actuated at high speed.

An actuator controller according to further another aspect of the invention comprises: a pair of springs which act in opposite directions; an armature which is connected to the springs and is supported in a neutral position provided by the springs in an inactivated state, the armature being coupled to a mechanical element; a pair of electromagnets which drive the armature between a first terminal position and a second terminal position; magnetic flux estimating means for estimating magnetic flux generated by the electromagnet attracting the armature when the armature is driven from one of the terminal positions to the other of the terminal positions; timing estimating means for estimating timing of the armature lift when the armature is driven from one of the terminal positions to the other of the terminal positions; and control means for controlling period of applying voltage to the electromagnet for attracting the armature in accordance with the magnetic flux estimated and the timing estimated.

Since the time for applying voltage to the electromagnet is controlled by estimating the magnetic flux to be generated by the electromagnet and the timing of the armature lift, the magnetic flux required for attracting the armature can be generated even if the lift timing of the armature is delayed.

According to another aspect of the invention, there is provided an actuator controller further includes means for detecting the maximum current value which flows through the electromagnet.

It is possible to estimate the lift timing for the armature by a simple method of detecting the maximum current value which flows through the electromagnet.

DETAILED DESCRIPTION OF THE PREFERRED EMBODIMENTS OF THE INVENTION

Figure 1:
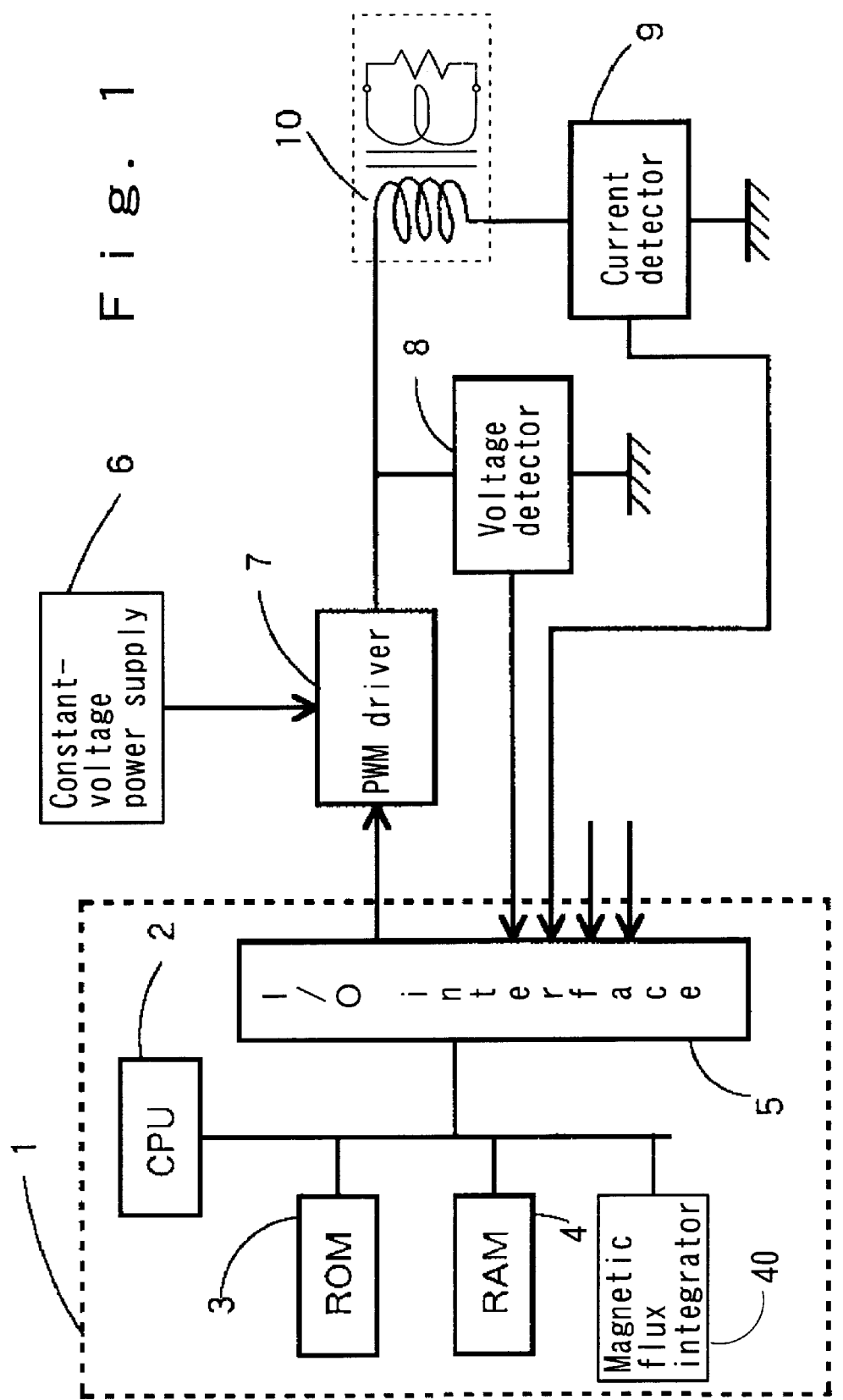
FIG. 1 is a block diagram showing the overall construction of an actuator according to an embodiment of the present invention.

With reference to the drawings, the description will be made of embodiments of the present invention. FIG. 1 is a block diagram showing the entire structure of an actuator controller according to one embodiment of the present invention. A controller 1 comprises: an arithmetic unit (CPU) 2; a read only memory (ROM) 3 for storing control programs and data; a random access memory (RAM) 4 for temporarily storing the data and proving a working area of CPU 2; and an I/O interface 5.

Figure 2:
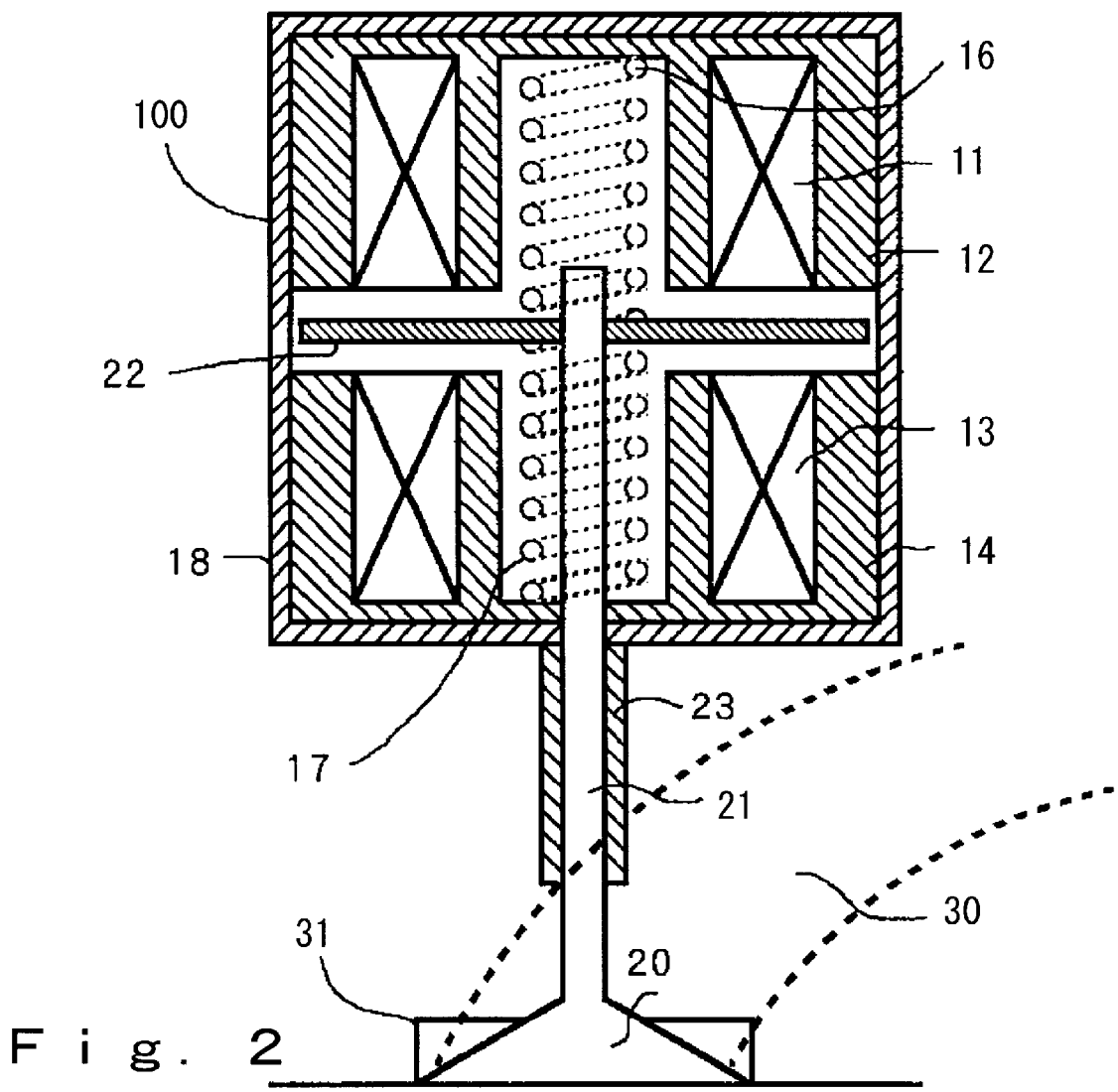
FIG. 2 is a view showing the mechanical construction of an actuator according to an embodiment of the present invention.
Figure 3:
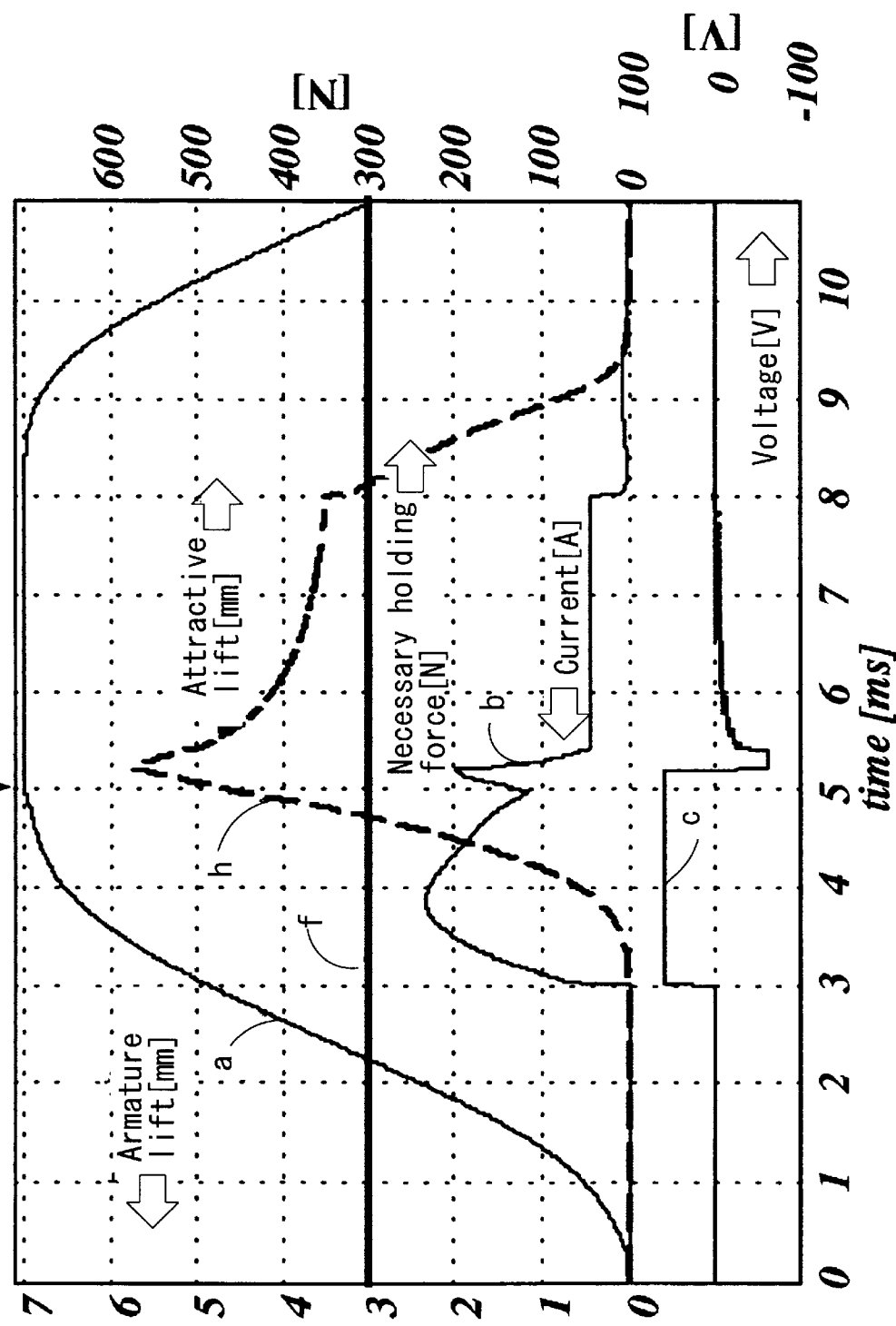
FIG. 3 is a view showing relationship among each parameter of a conventional actuator controller.

The electromagnet 10 indicates a first electromagnet 11 or a second electromagnet 13 in an actuator 100 shown in FIG. 2. A PWM (Pulse Width Modulation) driver 7 modulates voltage supplied from a constant-voltage power supply 6 in accordance with control signals from the controller 1. The voltage supplied to the electromagnet 10 is detected by a voltage detector 8, and the current through the electromagnet 10 is detected by a current detector 9. The constant-voltage power supply 6 is a power source for supplying constant voltage of, for example, 30V to 100V by boosting the voltage of 12V or the like supplied from a vehicle-mounted battery.

To the I/O interface 5 of the controller 1, are inputted a voltage detection signal from the voltage detector 8, a current detection signal from the current detector 9, a pulse signal indicating the number of revolutions of the engine as detected by a crank angle and revolution sensor, a signal from a temperature sensor of the electromagnet actuator 100, a throttle valve opening signal and an intake air pressure signal. On the basis of these input, the controller determines parameters such as timing of electric power supply, the magnitude of voltage to be supplied, time for supplying voltage, and the like in accordance with a control program stored in ROM3 in advance.

In one embodiment of the present invention, the electric power used to hold the armature in the seated position is supplied as a constant current. In this operation mode, the controller 1 sends a control signal to the PWM driver 7 to switch the constant-voltage power supply 6 such that it is switched to 12V and supplies voltage pulses of wave height value of 12V to the electromagnet 10. The controller 1 monitors the current value as detected by the current detector 9, and controls the duty ratio of the voltage pulse so that a constant current is supplied to the terminals of the electromagnet 10.

FIG. 2 is a sectional view showing the schematic structure of the actuator driven by the controller according to the present invention. The construction of this electromagnetic actuator itself is conventional. When it is driven upward by the electromagnetic actuator 100, the valve 20 is stopped at a position where it is tightly seated on a valve seat 31 provided in the engine intake port or exhaust port (hereinafter, referred to as "intake/exhaust port") 30, closing the intake/exhaust port 30. When it is driven downward by the electromagnetic actuator 100, the valve 20 leaves the valve seat 31, and lowers to a position which is spaced apart from the valve seat 31 by a predetermined distance, opening the intake/exhaust port.

The valve shaft 21 extending from the valve 20 is held in abore of a valve guide 23 to enable it to move in an axial direction. A disk-like armature 22 made of soft magnetic material is mounted to the upper end of the valve shaft 21. A first spring 16 and a second spring 17 jointly support the armature 22 in the middle of the space between a first electromagnet 11 and a second electromagnet 13.

In the housing 18 made of non-magnetic material in the actuator 100 are provided a first solenoid type electromagnet 11 positioned above the armature 22 and a second solenoid type electromagnet 13 positioned beneath the armature 22. The first electromagnet 11 is enclosed with a first magnetic yoke 12, and the second electromagnet 13 is enclosed with a second magnetic yoke 14.

The first spring 16 and the second spring 17 are provided in a balanced configuration so that the armature 22 is held in the middle of the gap between the first electromagnet 11 and the second electromagnet 13 while no driving current is applied to either the first electromagnet 11 or the second electromagnet 13.

Figure 4:
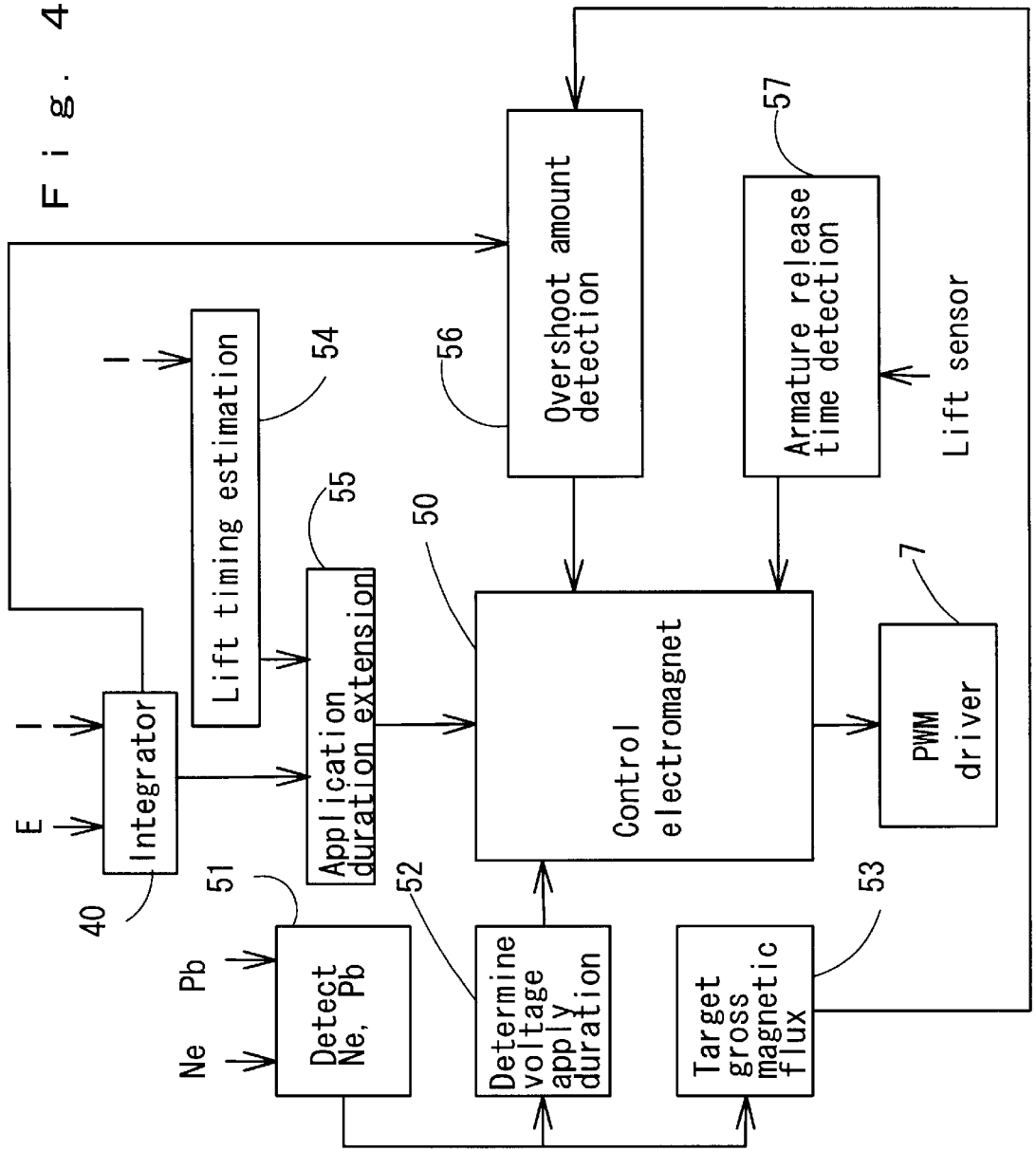
FIG. 4 is a functional block diagram showing an actuator controller according to an embodiment of the present invention.

FIG. 4 is a detailed functional block diagram showing the actuator controller 1 of FIG. 1. An electromagnet control unit 50 controls the PWM driver 7, and also controls application of a constant voltage to the coil of the electromagnet, application of a reverse voltage to the coil, supplying of a holding current to the coil, and the like.

A Ne, Pb detection unit 51 detects the engine revolutions Ne from the output of a revolution sensor, and detects intake tube pressure Pb from the output of an intake pressure sensor. Pb is a parameter indicating a load status of the engine, while Ne indicates an operating speed of a valve in the engine, and therefore, an operating speed of the armature of the actuator. In one embodiment of the present invention, a voltage application duration determination unit 52 determines an application duration and a starting time of voltage application to the electromagnet based on Ne and Pb. This determination is performed by referring to a map showing the relationship among Ne, Pb and voltage application duration, which is prepared in advance and is stored in the ROM3.

Similarly, a target magnetic flux determination unit 53 determines based on Ne and Pb a target value for the magnetic flux needed for attracting and seating the armature. This determination is performed by referring to a map showing the relationship among Ne, Pb and target gross magnetic flux, which is prepared in advance and is stored in the ROM3.

Figure 5:
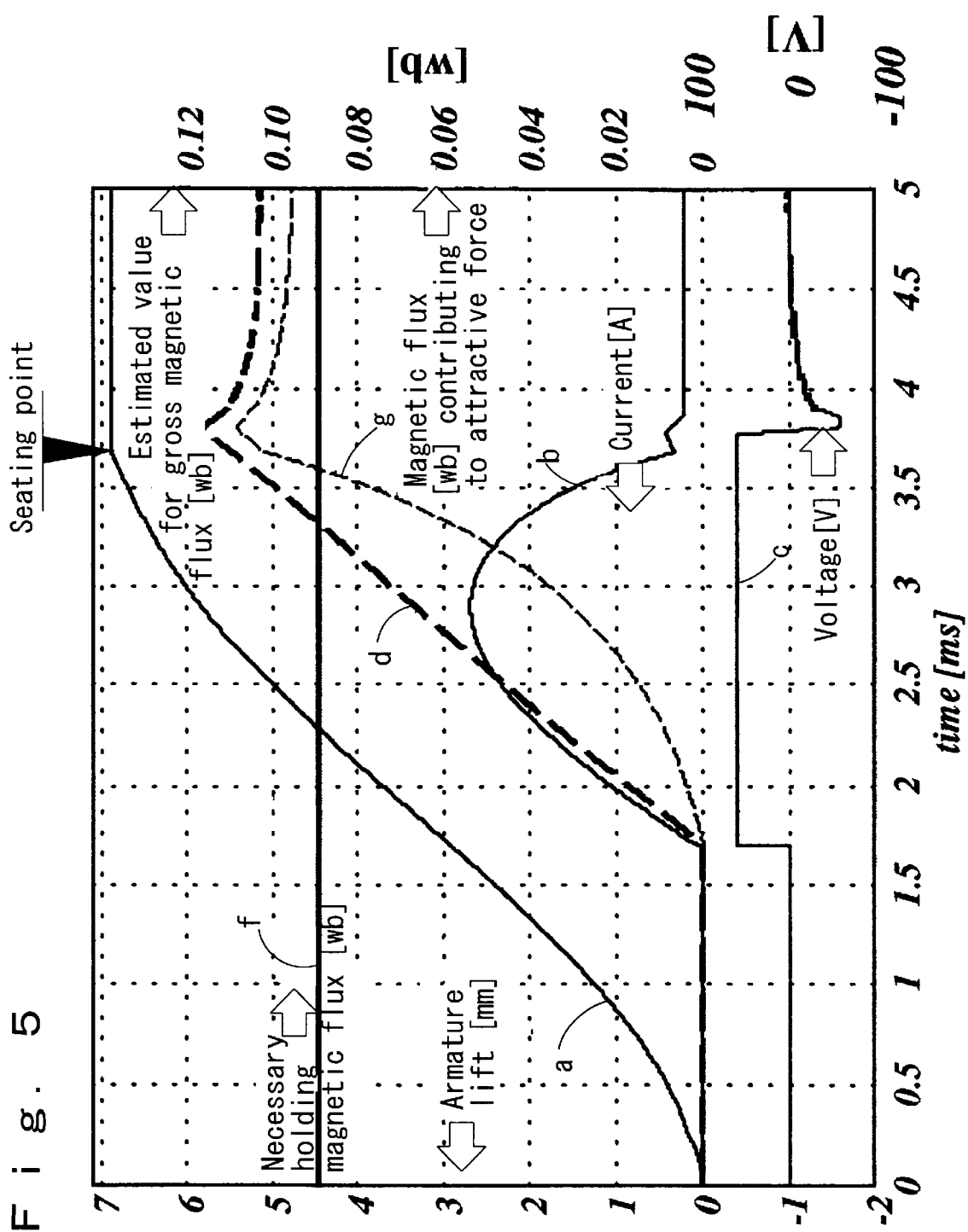
FIG. 5 is a view showing relationship of each parameter in an actuator controller according to an embodiment of the present invention.

When it is given voltage application starting time and duration from a voltage application duration determination unit 52, the electromagnet control unit 50 starts applying voltage to the electromagnet based on the time when the armature is released as detected by an armature release time detection unit 57. Referring to FIG. 5, at time 0 ms, the armature is released from one of the electromagnets and starts to move toward the other of the electromagnets by the influence of the springs. The electromagnet control unit 50 starts applying voltage to the coil of the other of the electromagnets at voltage starting time 1.7 ms set by the voltage application duration determination unit 52.

When application of voltage to the coil starts, an integrator 40 starts integral calculation of the gross magnetic flux based on voltage applied to the coil and current flowing through the coil in accordance with the equation to be described hereafter. A lift timing estimating unit 54 monitors the current flowing through the coil to estimate lag or lead in the lift timing based on the maximum current value. When the timing of the armature lift is delayed, the gap between the armature and the yoke of the electromagnet is larger than expected at every point in time of the armature displacement, resulting in a larger leakage magnetic flux, which in turn delays increase of the inductance of the actuator. A larger current flows to compensate for this delay. In other words, a large maximum current value indicates that there is a delay in the armature lift. Therefore, correlation between the maximum current value and the timing of the armature lift is determined in advance and a corresponding table is prepared and stored in the ROM3. A lag or lead value for the lift timing can be obtained by referring to such a table.

A voltage application duration extension unit 55 determines whether or not an application duration of the voltage to be applied to the coil should be extended based on a value of the gross magnetic flux given by the integrator 40 and a value indicating lag or lead in the lift timing given by the lift timing estimating unit 54. If the determination is affirmative, it sends to the electromagnet control unit 50 a signal indicating extension time. Here, the value indicating lag or lead in the lift timing can be the maximum current value detected by the current detector 9, and the application duration extension unit 55 can determine an amount of extension of the application duration based on the value of the gross magnetic flux and the maximum current value. In this case, a map providing the relationship between the gross magnetic flux, the maximum current value and the amount of extension in the application duration is prepared and is stored in the ROM3 in advance, and by referring to this map, the amount of extension in the application duration is determined.

An overshoot amount detection unit 56 compares the target gross magnetic flux given by the target magnetic flux determination unit 53 with a value of the gross magnetic flux at the present moment continuously given by the integrator 40, and when the present gross magnetic flux exceeds the target gross magnetic flux by a predetermined value or more, it sends a signal to the electromagnet control unit 50. The electromagnet control unit 50 stops application of constant voltage to the coil in response thereto, and applies reverse voltage to the coil in order to quickly decrease the surplus overshoot amount toward the target gross magnetic flux.

Referring now to FIG. 5, description will be made of technique whereby the integrator 40 estimates gross magnetic flux. When the yoke portion of the electromagnet has a laminated multi-layer structure similar to a yoke of a power transformer, the effect of eddy current loss of magnetic material can be greatly reduced, and the load becomes similar to a pure inductance element. In this case, the equation for an electromagnetic circuit is given as follows:

$$E \cong RI + \frac{d\Phi_{all}}{dt} \quad (1)$$

More specifically, terminal voltage E of the actuator is near the sum of a product of a direct current resistance (R) and a driving current of the coil (I) and time-variation of gross magnetic flux. Since there is actually an effect of the eddy current loss, R is larger than direct current resistance of the coil and is a function of time. By taking this difference into account, R is set to slightly larger than the direct current resistance, whereby sufficient precision in practical use can be obtained. On the basis of this equation, the gross magnetic flux $\Phi_{all}$ can be determined by the following equation:

$$\Phi_{all} = \int (E - RI) dt \quad (2)$$

Referring to FIG. 1, voltage E and current I can be measured by the voltage detector 8 and the current detector 9 respectively, and therefore the gross magnetic flux $\Phi_{all}$ can be computed by the integrator 40 with a function of resetting integrated values.

When application of voltage of 60V starts at time 1.7 ms as shown in FIG. 5, gross magnetic flux calculated by equation (2) increases substantially linearly as indicated by line "d". In an initial stage where the armature starts to move, a very small magnetic flux crosses the armature and a large amount of leakage magnetic flux exists. The magnetic flux which crosses the armature is as shown by the curve "g", the magnetic energy being stored in the gap and other leakage space.

As the displacement of the armature advances and the gap between the armature and the yoke of the electromagnet becomes smaller, the linkage of the armature and the magnetic flux increases exponentially. This abrupt increase weakens when the armature seats on the yoke of the electromagnet. A difference between the maximum value of the curve "d" and the maximum value of the curve "g" is attributable to R of the equation (2) that is set larger than the direct current resistance, and to the leakage magnetic flux that increases again when approaching the saturation area of the magnetic material. However, the correlation between the magnetic attractive force and an estimated value for the gross magnetic flux amount obtained in the equation (2) can be determined in an actual operation, and the controller can be designed on the basis thereof. Therefore, the above-mentioned difference will not be a problem.

Figure 6:
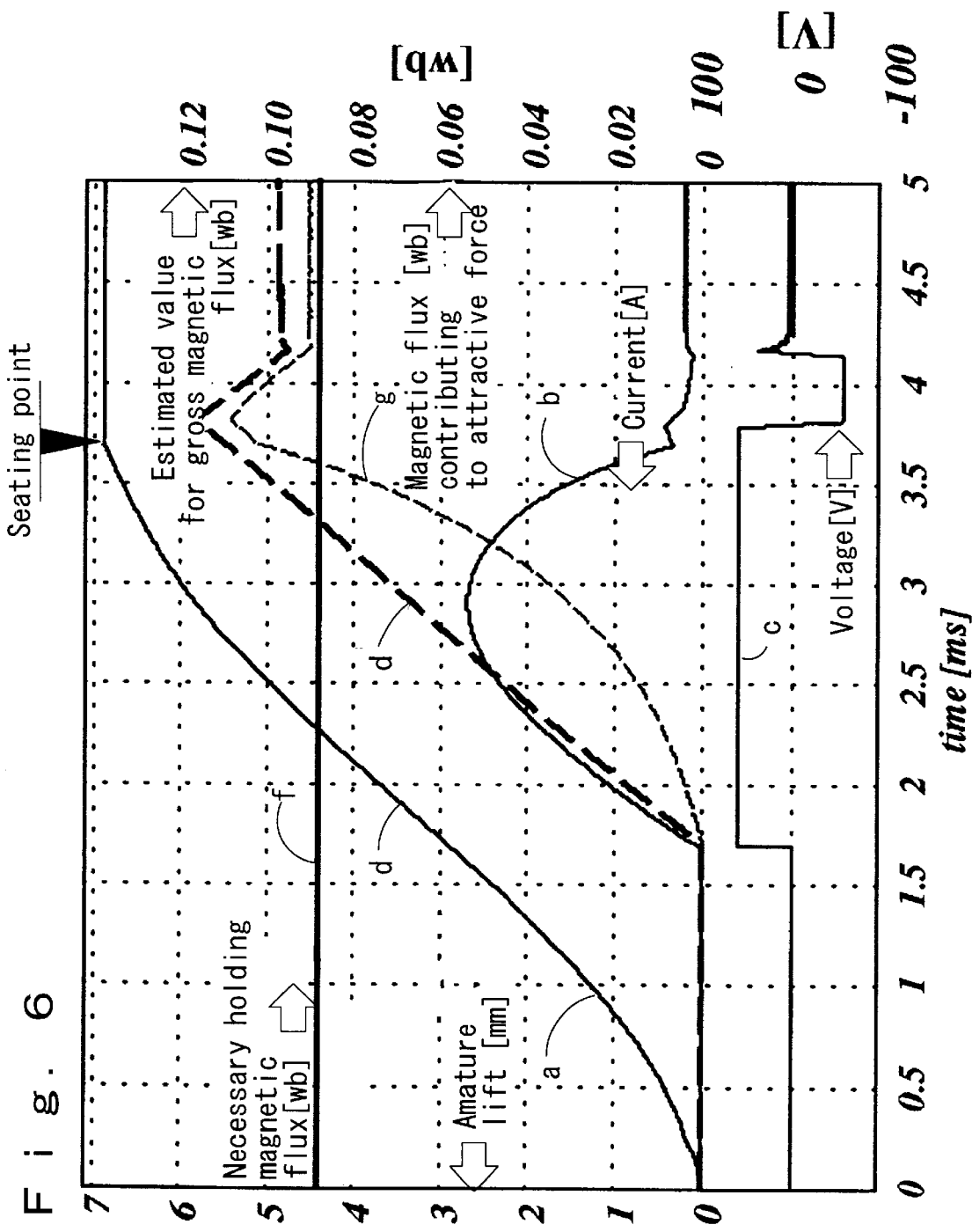
FIG. 6 is a view showing relationship of each parameter in an actuator controller according to an embodiment of the present invention.

In the manner described above, the magnetic flux when the armature gets seated can be estimated and the attractive force for the armature can be estimated. With reference to FIG. 6, the description will be made of correction control of the attractive force.

At a point in time where the estimated value for the gross magnetic flux amount reaches the target overshoot value immediately after the armature get seated, the supply of the constant voltage to the electromagnet is stopped to start supplying the holding current. At this point, the magnetic attractive force reaches its peak. As seen in the curve "c" of FIG. 6, a reverse voltage is applied to the driving coil of the electromagnet for an appropriate duration depending on the overshoot amount, for example, 0.5 ms to 0.9 ms to quickly correct the overshoot amount. Thereafter, a feedback control is performed such that the amount of magnetic flux contributing to the attractive force becomes equal to or slightly larger than the necessary holding magnetic flux (straight line "f").

Thus, it is possible to control the residual attractive force at the time of releasing the armature to a constant value even when the engine revolution varies, thus improving the accuracy of the valve timing.

Figure 7:
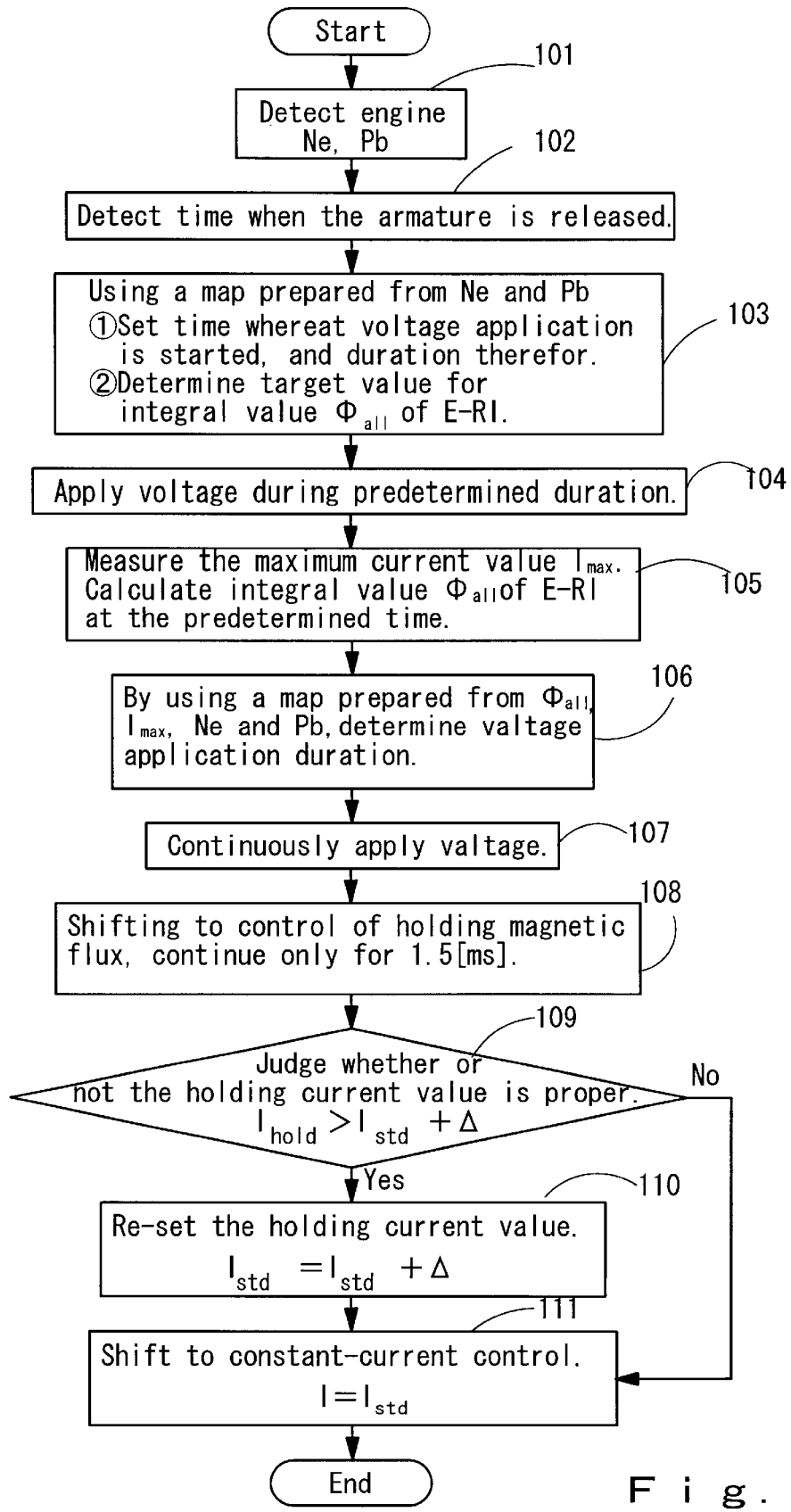
FIG. 7 is a view showing relationship of each parameter in an actuator controller according to an embodiment of the present invention.

With reference to FIG. 7, the description will be made of a control procedure according to another embodiment of the present invention. The engine revolutions Ne is detected by the engine revolutions sensor, and the intake manifold pressure Pb is detected by the pressure sensor (101). The time where the armature is released by the electromagnet on the opposite side is detected either by detecting the point in time when the power supply to the electromagnet in the opposite side is turned off, or by detecting the point in time when the armature lift sensor detects releasing of the armature (102).

By referring to the three-dimensional map prepared and stored in the ROM3 of the controller 1 in advance that represents relations among the engine revolution Ne, the intake tube pressure Pb and the target value for the gross magnetic flux $\Phi_{all}$ to be generated by the coil of the actuator, the target value for the gross magnetic flux $\Phi_{all}$ is determined based on the engine revolution Ne and the intake pipe pressure Pb (103). At the same time, the starting time where application of the constant voltage onto the coil starts as well as its duration is determined from the target value for the gross magnetic flux.

At the starting time determined in step 103, the constant voltage is applied to the coil (104). In the example of FIG. 6, the target value of the gross magnetic flux is 0.10 wb, and the application of the constant voltage starts at the time point of 1.7 ms. The magnetic flux integrator 40 calculates an integral value of the magnetic flux to get the gross magnetic flux $\Phi_{all}$ at the point in time where application of the constant voltage is stopped (105). Also, the maximum current value $I_{max}$ is measured.

From the map prepared from the gross magnetic flux $\Phi_{all}$, the maximum current value $I_{max}$, Ne and Pb, the period for additionally applying the constant voltage and the period for applying the reverse voltage are determined (106). During the period determined in this manner, application of the constant voltage is continued (107). Thereafter, the process enters the phase of controlling the holding magnetic flux. Taking the influence of a drift of the integral value into consideration, constant current supplying phase is entered 1.5 ms after entering the holding magnetic flux phase (108). A proper current value $I_{std}$ which ought to be realized when the armature gets properly seated is compared with a current value $I_{hold}$ obtained as a result of carrying out the magnetic flux control (109), and if the $I_{hold}$ is too large, the $I_{std}$ will be set again (110). If the holding current value is within a proper range, control of supplying constant current continues (111).

In FIG. 6, the application of constant voltage is stopped at a point in time of 3.7 ms, and reverse voltage for correcting the overshoot is applied for the period of 0.4 ms. The application duration of the reverse voltage is set in accordance with the overshoot amount. Specifically, a corresponding table between the overshoot amount and reverse voltage application duration is stored in the ROM3, and by referring to this table, the reverse voltage application duration is determined.

After completion of application of the reverse voltage, the process enters the phase of controlling the holding magnetic flux. In FIG. 6, the phase is entered at the time of 4.2 ms, and enters the phase of supplying a constant current in order to generate magnetic flux for holding the armature at the seated position.

Figure 8:
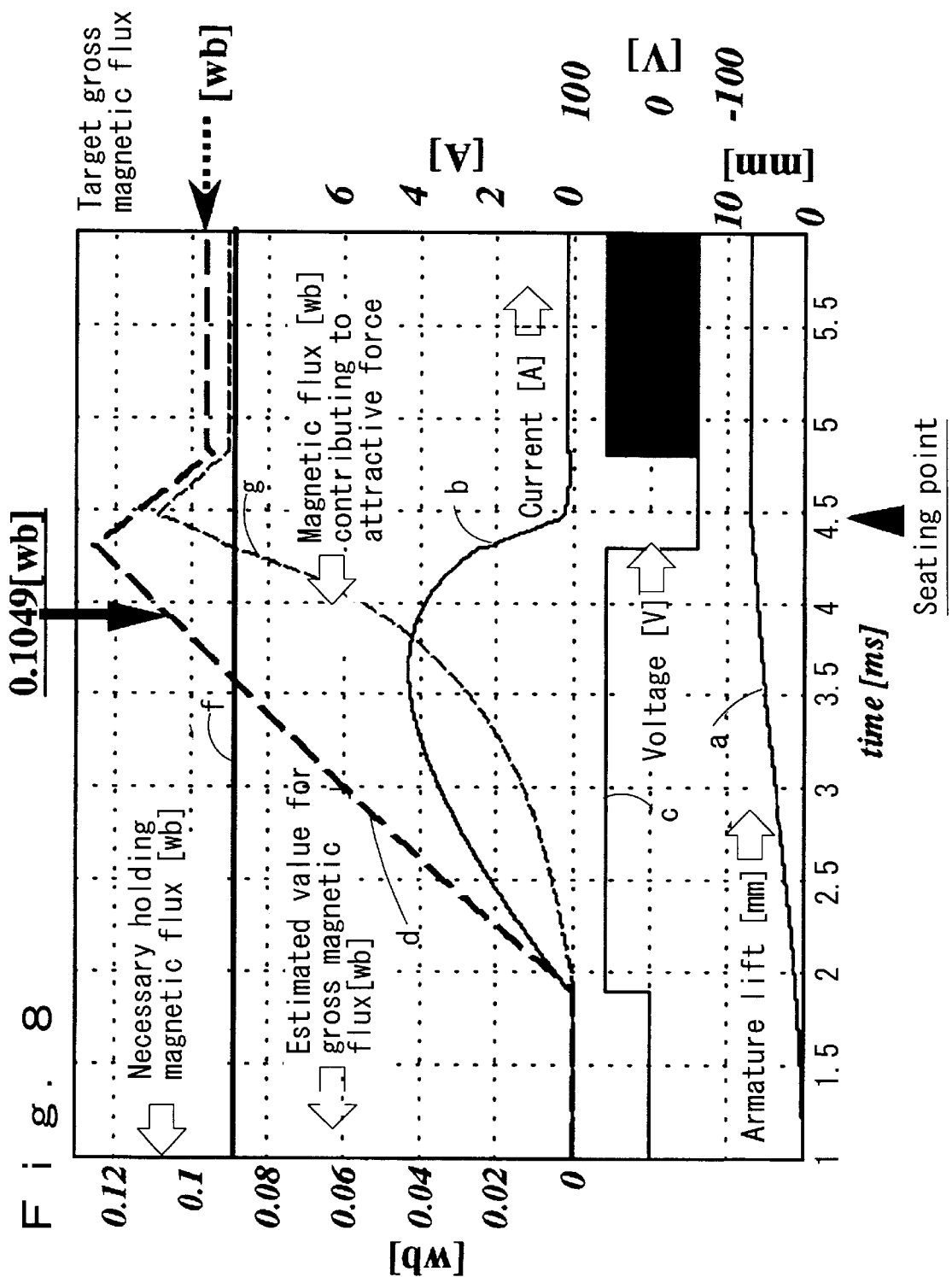
FIG. 8 is a view showing relationship of each parameter in an actuator controller according to an embodiment of the present invention.
Figure 9:
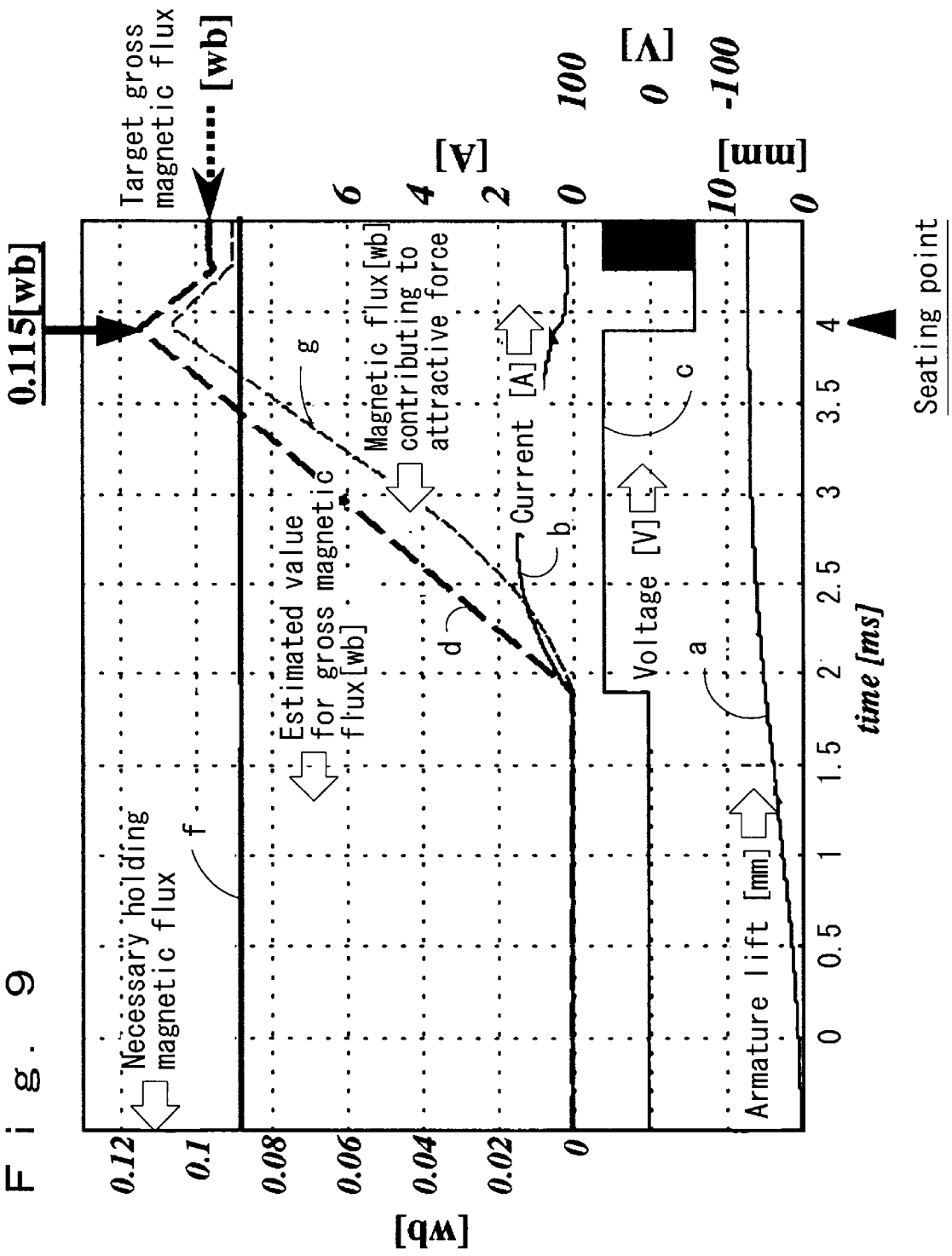
FIG. 9 is a view showing relationship of each parameter in an actuator controller according to an embodiment of the present invention.

As a further embodiment according to the present invention, the description will be made of an embodiment in which the actuator controller copes with variations in lift timing of the armature. FIG. 8 shows case where the lift timing of the armature is delayed relative to the starting timing of voltage "c". FIG. 9 shows a case where the lift timing of the armature advances relative to the voltage "c". In this respect, in FIGS. 8 and 9, the armature lift is indicated by the scale at the lower portion of the right vertical axis. In either FIG. 8 or FIG. 9, the application period of the constant voltage is 2.0 ms, and the target value of the gross magnetic flux $\Phi_{all}$ is 0.11 wb.

In FIG. 8, at 2.0 ms after application of voltage starts, the estimated value of the gross magnetic flux $\Phi_{all}$ is 0.1049 wb, and the maximum value $I_{max}$ of current is 4.291 amperes, wherein the gross magnetic flux is a little smaller than in FIG. 9 and the maximum current value is considerably larger than in FIG. 9. This is because the timing of the armature lift is delayed, causing larger gaps than expected at every point in time of the lift, leading to larger leakage magnetic flux, which in turn delays increase of the inductance of the actuator. So as to compensate for this phenomenon, larger current flows to produce increasing gross magnetic flux.

Thus, a large maximum value of the coil current means that the lift timing is delayed relative to the starting time of applying voltage "c". Therefore, by measuring the maximum current value, the delay in lift timing can be estimated. If there is a delay in the lift timing, the duration for applying constant voltage to be applied in order to seat the armature on the electromagnet must be made longer than when there is no delay in the lift timing. A corresponding table between the maximum current value and continuation (extension) time for voltage applied is prepared and stored in the ROM3 in advance, and by referring to this table, the extension time for the voltage application duration is determined.

Alternatively, a voltage application duration map can be prepared from the gross magnetic flux, the maximum current value, the engine revolution Ne and the intake tube pressure Pb, which can be stored in the ROM3 in advance, and the duration of voltage to be applied can also be determined by referring to this map.

In FIG. 9, at 2.0 ms after application of voltage starts, the estimated value of the gross magnetic flux $\Phi_{all}$ is 0.11147 wb, and the maximum value of current is 1.452 A. The gross magnetic flux is slightly larger than the target value and the maximum current value is considerably small. This is because the timing of the armature lift is fast, the gap in the lift is smaller than expected, and the leakage magnetic flux is small and therefore, the inductance of the actuator grows earlier, and a lower current flow to compensate for this phenomenon, which functions to maintain a constant increase of the gross magnetic flux.

Figure 10:
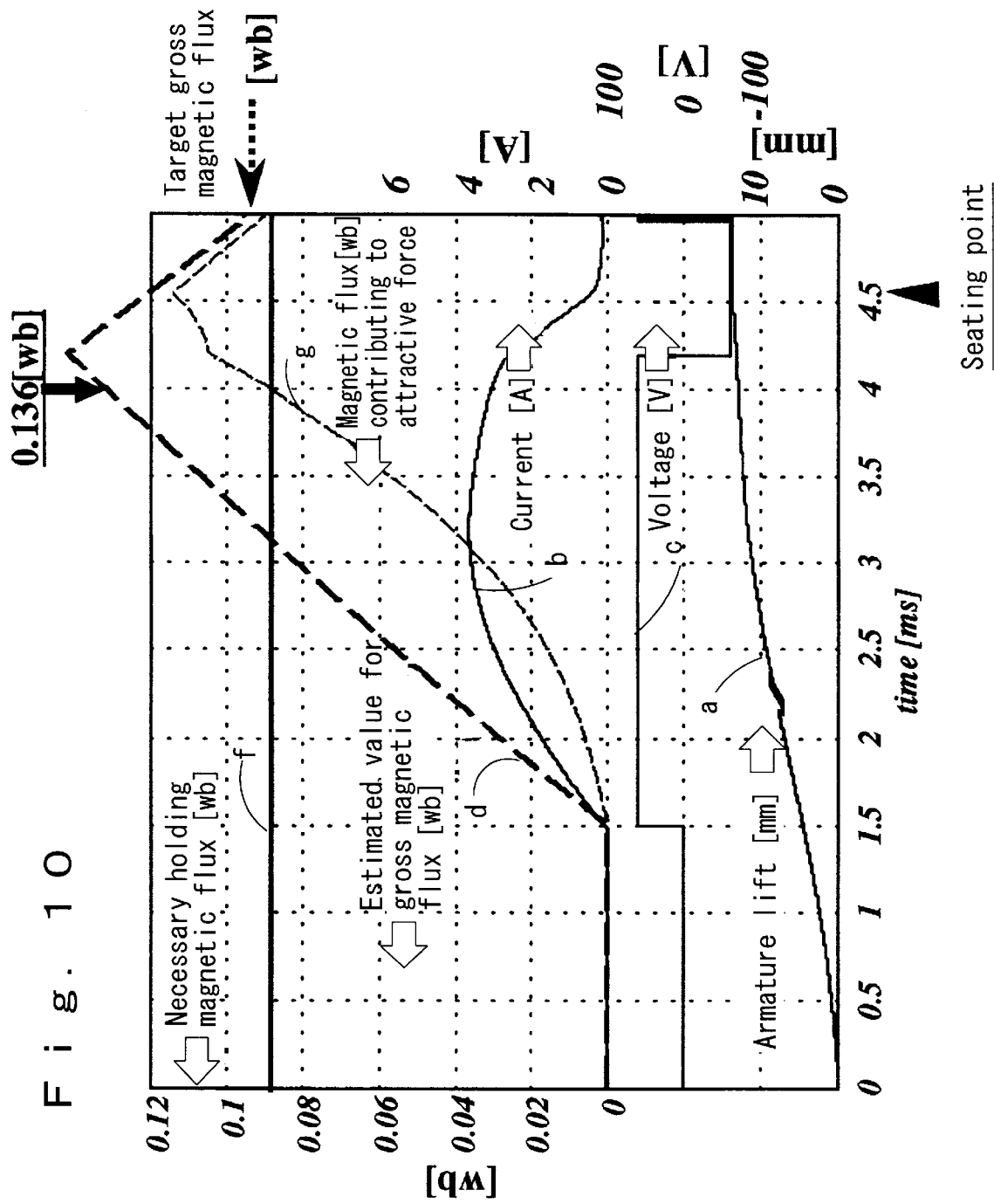
FIG. 10 is a view showing relationship of each parameter in an actuator controller according to an embodiment of the present invention.

FIG. 10 shows an operation when a change in friction causes a change in the force of movement of the armature. Specifically, such is a case when output of the engine increases causing exhaust gas pressure to rise. FIG. 10 shows a case where the force of the armature lift is diminished by an increased friction.

Since the force of the lift is diminished, a mechanical work to be performed by the attractive force increases. Therefore, the amount of energy inputted from the power supply must also be increased. A voltage applying period determination unit 52 refers to the map stored in the ROM3 based on the values of Ne and Pb, and obtains earlier time for starting constant voltage application such as 1.5 ms and a longer period for applying voltage such as 2.5 ms. A target gross magnetic flux determination unit 53 obtains a target gross magnetic flux value of 0.14 wb based on the Ne and Pb values.

In FIG. 10, at 2.5 ms after commencement of voltage application, the estimated value of the gross magnetic flux is 0.136 wb and the maximum value of current is 3.641 A. In this manner, the integral value of the gross magnetic flux is slightly small and the maximum current is large. This is because the armature lift is delayed under the influence of the friction, the gap is larger than expected at each time during lifting, and the leakage magnetic flux is large, and thus the increase of inductance of the actuator is delayed. To compensate for this phenomenon, a larger current flows so as to maintain the increase of the gross magnetic flux.

A voltage application duration extension unit 55 retrieves 0.35 ms by referring to a voltage application duration map prepared from $\Phi_{all}$, $I_{max}$, Ne and Pb, thereby extending application of constant voltage. Thereafter, the gross magnetic flux is controlled such that the magnetic flux contributing to the attractive force approaches the necessary holding magnetic flux. In this manner, an operation coping with increase in the mechanical friction is carried out. Taking the leakage magnetic flux and the like into consideration, the converging value for the gross magnetic flux is set to a value, for example, 0.097 wb which is slightly larger than the necessary holding magnetic flux,.

Figure 11:
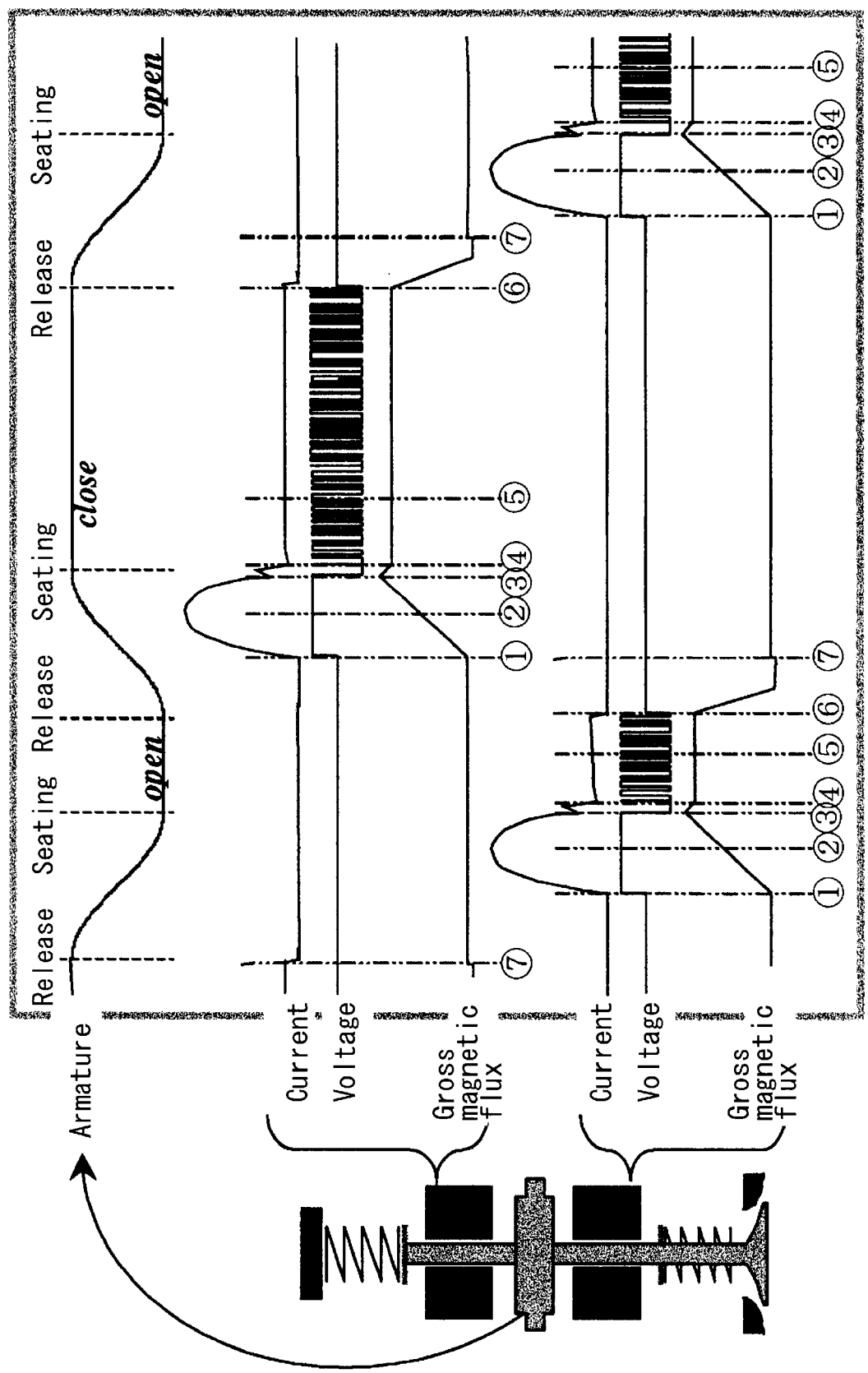
FIG. 11 is a view showing relationship of each parameter in an actuator controller according to an embodiment of the present invention.

FIG. 11 shows a state of voltage, current and gross magnetic flux to be applied to a pair of electromagnets when the present invention is applied to the electromagnetic valve/actuator of an engine. The reference numerals in FIG. 11 designate the followings:
① The zero-reset state of the estimated value $\Phi_{all}$ of the gross magnetic flux is released, and application of constant voltage (such as 60V) starts.
② Detection of the maximum current value
③ The target value of the gross magnetic flux (overshoot value is the target value) is reached, constant gross magnetic flux control starts
④ The target gross magnetic flux value is reached.
⑤ After 1.5 ms, changed to control with constant current ($I_{std}$) (at high rpm, may be omitted on the release side).
⑥ Armature release starts.
⑦ Zero-reset state of the estimated value of the gross magnetic flux starts.

In the foregoing, the present invention has been described with valve control of an automotive engine as an example, but the present invention is not limited to these embodiments.

According to the invention, since the electromagnet can be switched to the holding operation in response to the magnetic flux of the electromagnet for attracting the armature reached the target overshoot value, the phenomenon in which magnetic energy more than necessary remains in the electromagnet can be reduced.

According to an embodiment of the invention, the armature can be released from the electromagnet at quick timing and the actuator can be actuated at high speed.

Further, according to an embodiment of the invention, magnetic flux required for attracting the armature can be generated even if the armature lift timing is delayed.

According to another embodiment of the invention, armature lift timing can be estimated by a simple technique of detecting the maximum current value flowing through the electromagnet.

While the invention was described relative to specific embodiments, they are intended to be illustrative only and not limiting the scope of the invention.

What is claimed is:

1. An actuator controller, comprising:

a pair of springs acting in opposite directions;

an armature connected to said springs and supported in a neutral position provided by said springs in an inactivated state, said armature being coupled to a mechanical element;

a pair of electromagnets for driving said armature between a first terminal position and a second terminal position;

estimating means for estimating magnetic flux generated by one or the other of the pair of electromagnets attracting said armature when said armature is driven from one of the terminal positions to the other of the terminal positions; and means for switching said one or the other of the pair of electromagnets from an attracting phase to a holding phase when said magnetic flux estimated by the estimating means reaches a target value determined based on an operating speed of the armature.

2. The actuator controller according to claim 1, further comprising means for applying a reverse voltage to said electromagnet generating the attracting force, thereby decreasing the magnetic flux to a value required for holding said armature, said reverse voltage being determined based on a maximum value of magnetic flux estimated by said estimating means.

3. The actuator controller according to claim 2, wherein said estimating means estimate the magnetic flux based on a voltage applied to a coil of the actuator and a current flowing through the coil.

4. The actuator controller according to claim 2, further comprising:

means for determining said target value for the magnetic flux needed for attracting and seating the armature; and overshoot detecting means for comparing the target value determined by said means for determining with a value estimated by said estimating means.

5. The actuator controller according to claim 4, wherein said means for switching is activated by an output from said overshoot detecting means indicating that the present magnetic flux is larger than the target value.

6. An actuator controller comprising:

a pair of springs acting in opposite directions;

an armature connected to said springs and supported in a neutral position provided by said springs in an inactivated state, said armature being coupled to a mechanical element;

a pair of electromagnets for driving said armature between a first terminal position and a second terminal position;

estimating means for estimating magnetic flux generated by one or the other of the pair of electromagnets attracting said armature when said armature is driven from one of the terminal positions to the other of the terminal positions; and means for switching said one or the other of the pair of electromagnets from an attracting phase to a holding phase when said magnetic flux estimated by the estimating means reaches a target value;

means for determining said target value for the magnetic flux for attracting and seating the armature; and overshoot detecting means for comparing the target value determined by said means for determining with a value estimated by said estimating means.

7. An actuator controller, comprising:

a pair of springs which act in opposite directions;

an armature connected to said springs and supported in a neutral position provided by said springs in an inactivated state, said armature being coupled to a mechanical element;

a pair of electromagnets for driving said armature between a first terminal position and a second terminal position;

magnetic flux estimating means for estimating magnetic flux generated by the electromagnet attracting said armature when said armature is driven from one of the terminal positions to the other of the terminal positions;

timing estimating means for estimating timing of the armature lift when said armature is driven from one of the terminal positions to the other of the terminal positions; and control means for controlling the period of applying voltage to the electromagnet for attracting said armature in accordance with said magnetic flux estimated and said timing of the armature lift.

8. The actuator controller according to claim 7 wherein said mechanical element is a valve shaft of an engine.

9. The actuator controller according to claim 8, further comprising:

period determining means for determining a period for applying voltage to one of the electromagnet based on a load of the engine.

10. The actuator controller according to claim 9, wherein said control means determines extension of the period determined by said period determining means based on magnetic flux estimated by said magnetic flux estimating means and said timing of the armature lift.

11. The actuator controller according to claim 10, wherein said timing estimating means detects the maximum current flowing through the electromagnet.

12. A method of controlling a valve actuator of an engine that drives a valve by a pair of electromagnets, comprising the steps of:

detecting releasing of the valve;

determining timing and duration of applying voltage to one or the other of said pair of electromagnets that is to attract the valve;

determining a target value of magnetic flux based on operating speed of the armature;

estimating magnetic flux generated by said one or the other of the pair of electromagnets;

comparing the estimated magnetic flux with the target value; and switching said electromagnet from an attracting phase to a holding phase when said estimated magnetic flux reaches the target value.

13. The method according to claim 12, further comprising the step of:

applying a reverse voltage to said one of the electromagnets responsive to comparison result indicating that the estimated magnetic flux is larger than the target value.

14. A method of controlling a valve actuator of an engine that drives a valve by a pair of electromagnets, comprising the steps of:

detecting releasing of the valve;

determining timing and duration of applying voltage to one or the other of said pair of electromagnets that is to attract the valve, said timing of applying voltage being determined by reference to a map that defines the relationship among said timing and engine revolution as well as engine load;

determining a target value of magnetic flux to be produced by said one of said pair of the electromagnets for attracting the valve;

estimating magnetic flux generated by said one of said pair of electromagnets;

comparing the estimated magnetic flux with the target value; and switching said one of said pair of electromagnets from an attracting phase to a holding phase when said estimated magnetic flux reaches the target value.

15. The method according to claim 14, wherein said duration of applying voltage is determined by reference to a map that defines the relationship among said duration and engine revolution as well as engine load.

16. The method according to claim 12, further comprising the steps of:

estimating a lift timing; and determining extension of said duration of applying voltage based on the estimated magnetic flux and the estimated lift timing.

17. A method of controlling a valve actuator of an engine that drives a valve by a pair or electromagnets comprising the steps of:

detecting releasing of the valve;

determining timing and duration of applying voltage to one of said pair of electromagnets that is to attract the valve;

determining a target value of magnetic flux to be produced by said one of said pair of electromagnets for attracting the valve;

estimating magnetic flux generated by said one of said pair of electromagnets;

comparing the estimated magnetic flux with the target value;

switching said one of said pair of electromagnets from and attracting phase to a holding phase when said estimated magnetic flux reaches the target value;

estimating a lift timing; and determining extension of said duration of applying voltage based on the estimated magnetic flux and the estimated lift timing, said extension of said duration of applying voltage being determined by reference to a map that defines the relationship among the estimated magnetic flux, the estimated lift timing, engine revolution and the engine load.

18. The method according to claim 17, wherein said lift timing is estimated based on a maximum current through said one of the electromagnets.

19. The method according to claim 13, wherein switching to the holding phase is carried out after application of the reverse voltage.

* * * * *